United States Patent
Mostinski et al.

(10) Patent No.: US 9,094,441 B2
(45) Date of Patent: Jul. 28, 2015

(54) METHOD AND DEVICE FOR PROVIDING A SECURITY BREACH INDICATIVE AUDIO ALERT

(75) Inventors: Roman Mostinski, Jerusalem (IL); Asaf Ashkenazi, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1479 days.

(21) Appl. No.: 12/304,193

(22) PCT Filed: Jun. 13, 2006

(86) PCT No.: PCT/IB2006/051894
§ 371 (c)(1),
(2), (4) Date: Feb. 23, 2011

(87) PCT Pub. No.: WO2007/144701
PCT Pub. Date: Dec. 21, 2007

(65) Prior Publication Data
US 2011/0154509 A1    Jun. 23, 2011

(51) Int. Cl.
*G08B 3/00* (2006.01)
*H04L 29/06* (2006.01)
*G06F 21/55* (2013.01)
*G06F 21/56* (2013.01)

(52) U.S. Cl.
CPC .......... *H04L 63/1416* (2013.01); *G06F 21/554* (2013.01); *G06F 21/566* (2013.01)

(58) Field of Classification Search
CPC .................................................. H04L 63/1416
USPC ...................... 340/384.1; 381/56, 119, 82, 98
See application file for complete search history.

(56) References Cited

U.S. PATENT DOCUMENTS

| | | | |
|---|---|---|---|
| 5,400,246 A * | 3/1995 | Wilson et al. | 700/17 |
| 5,990,880 A * | 11/1999 | Huffman et al. | 345/660 |
| 6,721,721 B1 | 4/2004 | Bates et al. | |
| 6,892,131 B2 * | 5/2005 | Coffee et al. | 701/482 |
| 7,224,811 B1 * | 5/2007 | Narusawa et al. | 381/119 |
| 7,385,496 B2 * | 6/2008 | Ogino et al. | 340/506 |
| 8,391,501 B2 * | 3/2013 | Khawand et al. | 381/56 |
| 2004/0083384 A1 | 4/2004 | Hypponen | |
| 2005/0216762 A1 | 9/2005 | Peikari | |
| 2005/0268337 A1 | 12/2005 | Norton et al. | |
| 2007/0266256 A1 * | 11/2007 | Shah et al. | 713/178 |
| 2008/0144858 A1 * | 6/2008 | Khawand et al. | 381/99 |

* cited by examiner

Primary Examiner — Daryl Pope

(57) ABSTRACT

A device for providing a security breach indicative audio alert. The device includes: a security monitor adapted to detect a security breach in device and a loudspeaker, the device wherein including a secure audio alert generating hardware, adapted to participate, in response to the detection of the security breach, in a generation of a security breach indicative audio alert. The secure audio alert generating hardware is connected to an audio mixer that is adapted to mix the security breach indicative audio alert signal with audio signals generated by a software controlled audio source to provide a mixed signal. The audio mixer is further adapted to provide the mixed signal to the loudspeaker that reproduces the mixed signal as sound.

16 Claims, 5 Drawing Sheets

– 1 –

METHOD AND DEVICE FOR PROVIDING A SECURITY BREACH INDICATIVE AUDIO ALERT

FIELD OF THE INVENTION

The invention relates to methods and devices for providing a security breach indicative audio alert.

BACKGROUND OF THE INVENTION

Mobile devices such as cellular phones, media players and personal data accessories are capable of executing state of the art software. Typically, this state of the art software includes operating systems, applications, APIs and the like.

Few years ago only desktop computers and computer systems were subjected to attacks. Over the last couple of years even mobile devices are subjected to attacks.

When an attack succeeds the hacker can control the execution of software by the device, can insert his own software and the like. Usually, once the attack succeeds the hacker can prevent the previously executed software from sending security breach alerts, even when the device is capable of detecting the breach.

Some prior art devices addressed this problem by using dedicated light emitting diodes that provided a visual indication of the security breach. This solution is relatively costly. This solution is size and energy consuming, especially in small sized mobile devices.

There is a need to provide an efficient method and device for providing a security breach indicative signal.

SUMMARY OF THE PRESENT INVENTION

A method and device for providing a security breach indicative audio alert, as described in the accompanying claims.

BRIEF DESCRIPTION OF THE DRAWINGS

The present invention will be understood and appreciated more fully from the following detailed description of embodiments thereof taken in conjunction with the accompanying drawings in which.

DETAILED DESCRIPTION OF THE DRAWINGS

Figure 1:
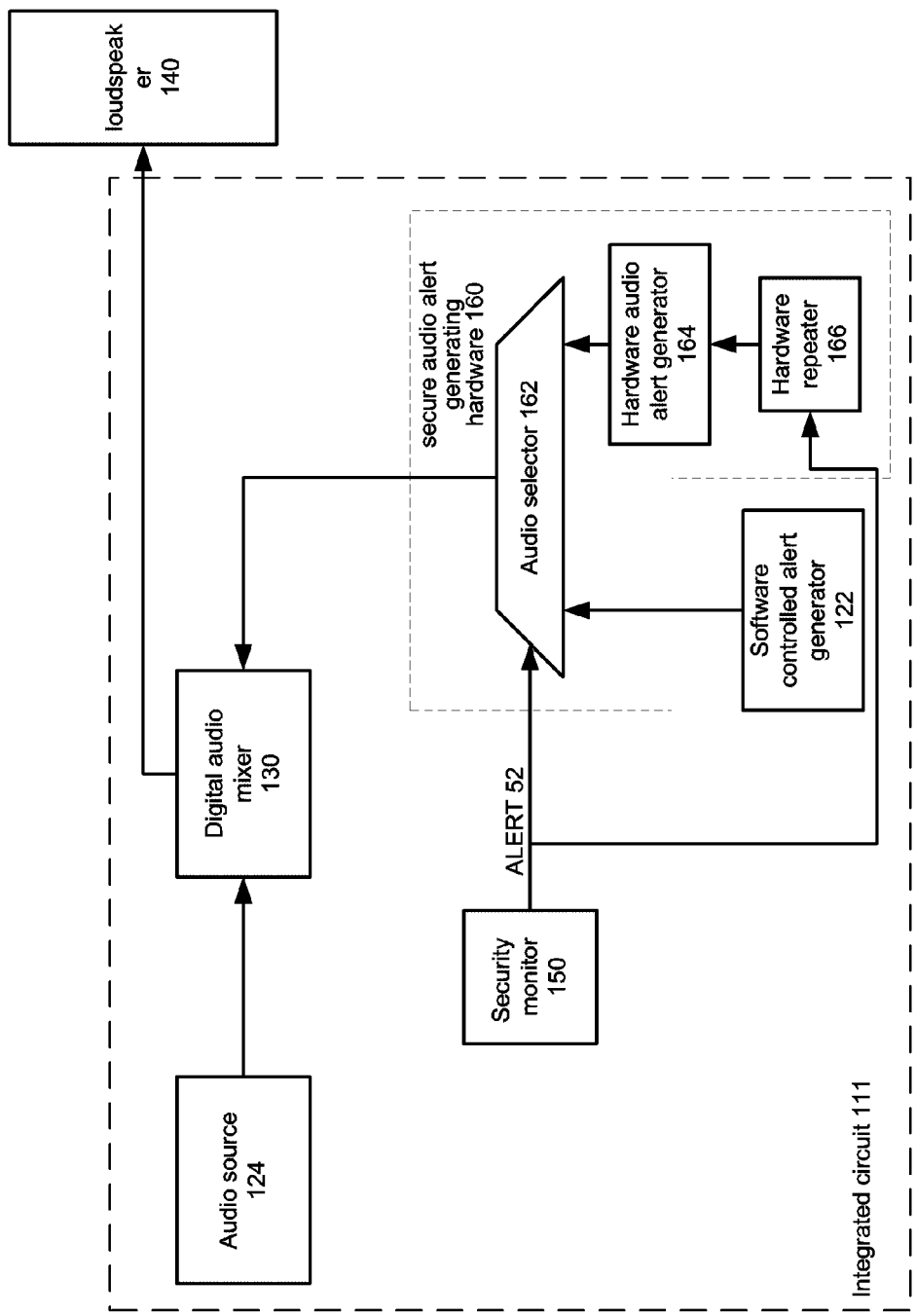
FIG. 1 illustrates a device according to an embodiment of the invention.

When appropriate, like reference numerals and characters may designate identical, corresponding or similar components in differing figure drawings.

According to various embodiments illustrated in the following drawings a security alert indication can be provided. The indication is provided once a security breach is detected. It does not require a dedicated LED or dedicated external pins and wires for providing the security breach indication. Furthermore, the security breach audio (and optionally audio-visual indication) is generated by using hardware that is not controlled by software and therefore is not exposed to hacking attempts.

FIG. 1 illustrates a device 110 according to an embodiment of the invention.

Device 110 can be included in a data and/or media processing apparatus (hereinafter information processing apparatus).

Device 110 includes integrated circuit 111 that includes: (i) security monitor 50 adapted to detect a security breach in device 110, (ii) loudspeaker 140, (iii) software controlled alert generator 122, (iv) secure audio alert generating hardware 160 that adapted to participate, in response to the detection of the security breach, in a generation of a security breach indicative audio alert; (v) audio source 124 such as a software controller audio source, and (vi) audio mixer 130 adapted to mix the security breach indicative audio alert signal with audio signals generated by software controlled audio source 124 to provide a mixed signal.

Mixed signal Smix 154 is provided to loudspeaker 140 that is adapted to reproduce the mixed signal as sound. It is noted that if audio source 124 does not provide any audio signal than the mixed signal Smix 154 will ideally include the security breach indicative audio alert signal.

It is noted that audio mixer 124 receives digital (and optionally analog) signals that represent sounds. These signals, when provided to a loudspeaker (such as loudspeaker 140) are converted to sound. For simplicity of explanation the signals provided to mixer 130 are referred to as audio signals.

It is further notes that various audio components can be connected between the audio mixer 130 and loudspeaker 140. These audio components can include amplifiers, digital to analog converters, filters and the like.

It is noted that the software controlled alert generator 122 and the audio source 124 can be controlled by the same controller (or processor) and that they both can be included within the component. For example the audio source can be an application that is executed by a processor while the software controller alert generator 122 can also be an application that is being executed by the same processor. This is not necessarily so. For example, the audio source can be a dedicated hardware component.

Security monitor 50 is adapted to detect a security breach and to assert a security breach signal (ALERT 52) to the secure audio alert generating hardware 160. It is noted that the number of signals generated by security monitor 50 can exceed one and that ALERT 52 can be negated (and not asserted) when a security breach is detected.

The security monitor can detect the security breach using one out of many prior art methods. For example, the security monitor 50 can compare between a currently executed software and previously stored version of that software.

Alternatively or additionally, security monitor 50 can detect an attempt to tamper the device (including applying force on the device, opening the device, and the like). Security monitor 50 can include a switch that alters its state when the housing of the device is breached.

Such a tamper attempt can be made in order to copy copyrighted works stored in the device. The tamper attempt can be performed in order to access an internal interface between an application processor and between either a monitor and/or an external audio codec.

Alternatively or additionally, the security monitor can detect that a certain key was presses, that a certain combination of keys were pressed and the like.

According to various embodiments of the invention the security monitor 50 can monitor potential violations of the integrity of one or more programs (for example, an occurrence of a malicious cod running, an attempt to substitute code and the like).

Security monitor 50 can detect a security violation in a security application that can require a user to send or to process some critical data (such as a credit card number, PIN codes and the like).

Conveniently, security monitor 50 can detect an unauthorized boot attempt and the like.

Conveniently, the security monitor 50 can generate JTAG, BIST or RTIC related alerts, an anti-virus indication but this is not necessarily so.

Security monitor 50 is characterized by a certain security level that enable it to generate alerts even device 10 was tampered or hacked.

Secure audio alert generating hardware 160 is secure because it is not influences by software and especially is not influenced by a hacking attempt. Secure audio alert generating hardware 160 includes audio selector 162, hardware audio alert generator 164 and an optional hardware repeater 166. Audio selector 162 selects between signals provided by hardware audio alert generator 164 and between signals provided by software controller alert generator 122 in response to the assertion or negation of ALERT 52.

Conveniently, hardware audio alert generator 164 can output alert signals in a repetitive manner, wherein the amount of repetitions or their duration is responsive to a trigger from hardware repeater 166. This allows a repetition of the generation of the audio alert while a security breach is detected, or during a more limited alert period.

The hardware audio alert generator 164 can generate various signal sequences that will be eventually heard by a human. The spectral signature of sounds that will be generated by device 110 in response to the security breach indicative audio alert signal outputted by hardware audio alert generator 164 is defined such as to be heard by human beings.

Conveniently, in order to avoid the masking of the security breach indicative audio alert signal (or at least in order to greatly complicate said masking) the device 110 can change dynamically (for example in a periodical manner or in a random manner) the characteristics of the security breach indicative audio alert signal.

Optionally the audio alert signal can have statistical characteristics. It can be an AWGN (Additive White Gaussian Noise, or a painted (narrower band) white noise, a pre-programmed watermark, or a repetitive audio alert, such as "this content is pirated".

It is noted that the security monitor 50 can send multiple control signals (depending upon the detected breach/alert) and that these control signals can select one out of multiple audio signals provided by secure audio alert generating hardware 160.

Figure 2:
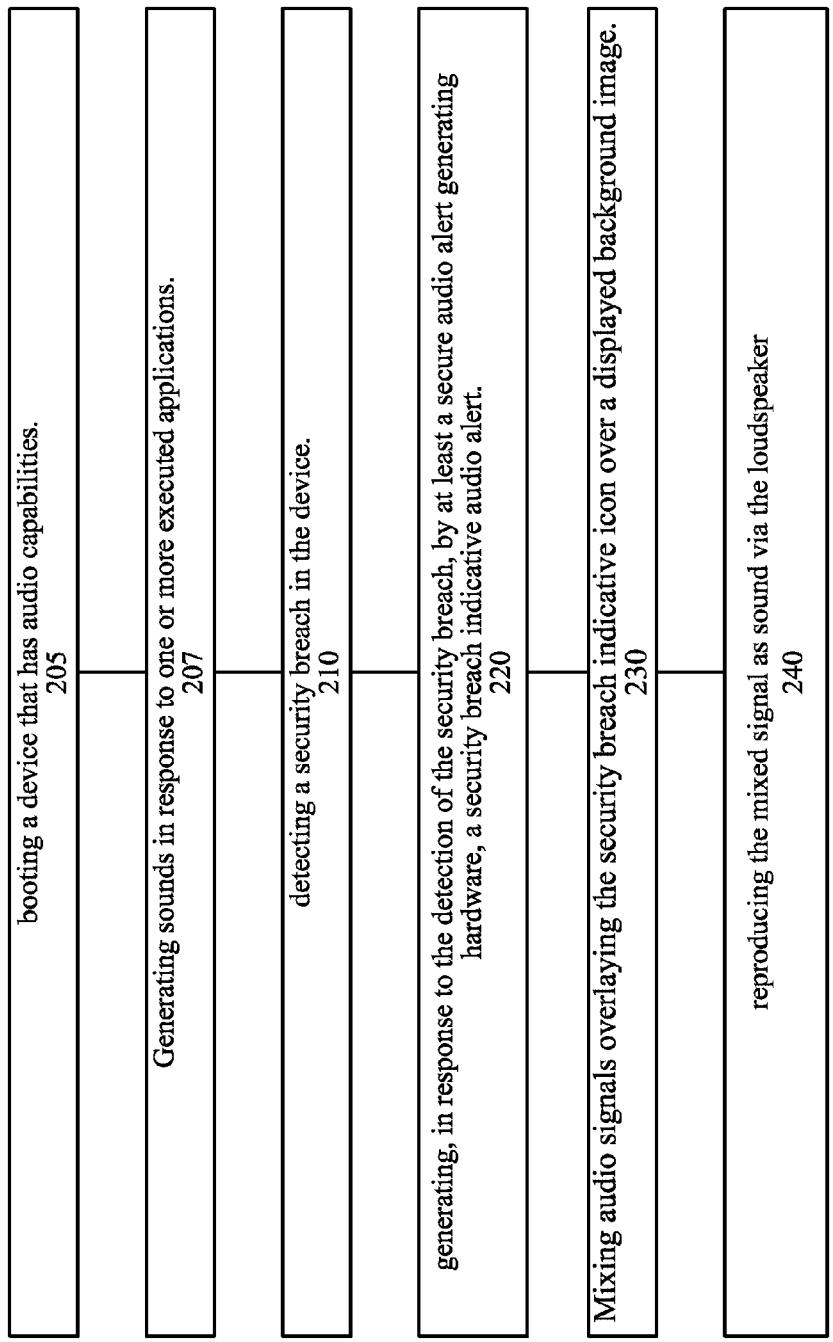
FIG. 2 illustrates a method for providing a security breach indicative audio alert according to an embodiment of the invention.

FIG. 2 illustrates method 200 for providing a security breach indicative audio alert according to an embodiment of the invention.

Method 200 starts by optional stage 205 of booting a device that includes a loudspeaker. The device can be a music player, a media player, a mobile phone, a personal data accessory and the like. The device can be device 110 of FIG. 1 or device 10 of FIG. 3, but this is not necessarily so.

Stage 205 can be followed by stage 207 of generating sounds in response to one or more executed application. This stage includes generating sounds by software-controlled components such as a processor, and the like. The sounds can be responsive to wirelessly received information, to stored information, to information received over wires and the like.

Method 200 continues to stage 210 of detecting a security breach in a device that comprises a loudspeaker.

Stage 210 is followed by stage 220 of generating, in response to the detection of the security breach, by a secure audio alert generating hardware, a security breach indicative audio alert signal.

Conveniently, stage 220 can include at least one of the following: (i) generating a security breach indicative audio alert signal, (ii) repetitively generating a security breach indicative audio alert signal, for a predefined alert period, (iii) randomly altering at least one characteristic of the security breach indicative audio alert signal, and (iv) dynamically altering at least one characteristic of the security breach indicative audio alert signal.

Stage 220 is followed by stage 230 of mixing the security breach indicative audio alert signal with audio signals generated by a software controlled audio source to provide a mixed signal.

Stage 230 is followed by stage 240 of reproducing the mixed signal as sound via the loudspeaker.

Figure 3:
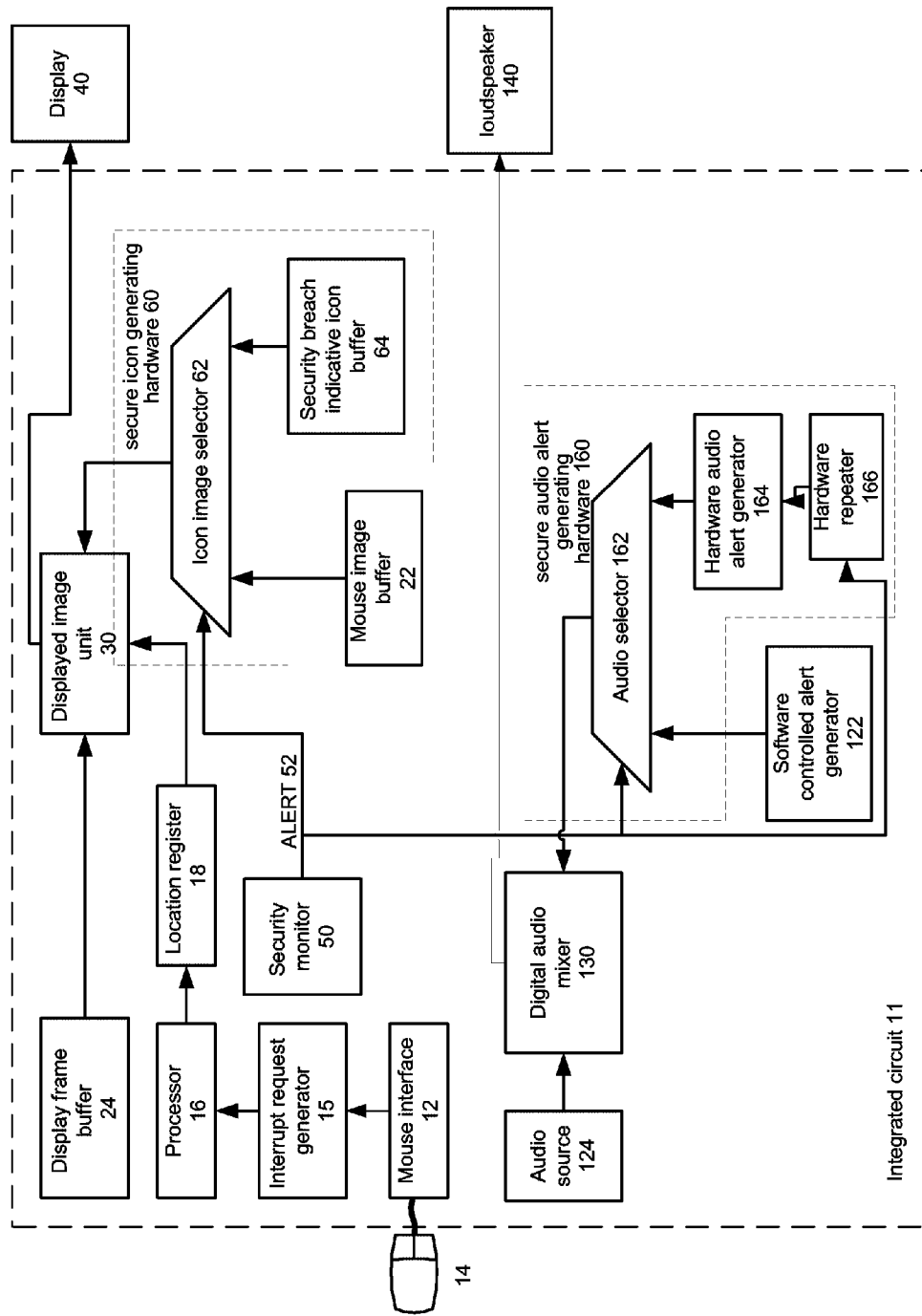
FIG. 3 illustrates a device according to another embodiment of the invention.

FIG. 3 illustrates device 10 according to an embodiment of the invention. Device 10 of FIG. 3 differs from device 110 of FIG. 1 by having additional components that allow device 10 to display a security breach indicative icon, in addition to the generation of the security breach indicative audio alert.

Device 10 conveniently includes an integrated circuit 11.

Device 10 further includes a mouse interface 12 that is connected to a mouse 14, and is expected to display a mouse icon.

Mouse interface 12 is connected to interrupt request generator 15 that generates interrupt requests to a processor 16 when the mouse moves. The execution of the interrupt results in storing mouse location information in a location register 18. The mouse location information usually includes an X-axis component and a Y-axis component.

Device 10 can use various prior art solutions for generating mouse icons. U.S. Pat. No. 6,496,891 of Cluff et al., which is incorporated herein by reference, describes a device and method for interfacing with PS/2 mice and USB mice.

The mouse icon is characterized by its location as well as by its image. The image of the mouse icon is controlled by software and is stored in a mouse image buffer 22. Typical mouse images include multiple bits. These images usually include sixteen by sixteen pixels, thirty two by thirty two pixels and the like. The size of the mouse icon as well as the display resolution can affect the number of pixels. Each pixel is represented by three multi-bit color components.

Background image information is stored at a display frame buffer 24. This background image information can be generated by the operating system, by an application or any other software executed by device 10.

Assuming that there is not security breach. In such a case the displayed image unit 30 generates a displayed image by blending the background image with the mouse icon. It can access the location register 18, the mouse image buffer 22 and the display frame buffer 24 and generate a displayed image. This image is sent to the display 40. Display 40 is not dedicated for displaying the security breach indicative icon.

Device 10 also includes a security monitor 50 and a secure icon generating hardware 60. Security monitor 50 is adapted to detect a security breach and to assert a security breach signal (ALERT 52) to the secure icon generating hardware 60. It is noted that the number of signals generated by the security monitor can exceed one and that ALERT 52 can be negated (and not asserted) when a security breach is detected.

The security monitor can detect the security breach using one out of many prior art methods. For example, the security monitor 50 can compare between a currently executed software and previously stored version of that software.

The secure icon generating hardware 60 is secure because it is not influences by software and especially is not influenced by a hacking attempt. The secure icon generating hardware 60 includes a security breach indicative icon buffer 64 that stores an image of the security breach indicative icon, and icon image selector 62. The icon image selector 62 selects between the security breach indicative icon buffer 64 and between the mouse image buffer 22, in response to the assertion or negation of ALERT 52.

Conveniently, the displayed image unit 30 generates a displayed image by overlaying the security breach indicative icon over the background image. It is noted that the location of the security breach indicative icon can be responsive to the location of the mouse. Thus, once the mouse moves an interrupt request is generated and the location information in location register 18 is updated. The displayed image unit 30 updates the displayed image in response to changes in the location information as well as in response to the background image stored in the display frame buffer 24.

The displayed image unit 30 can perform various image refreshing, according to various prior art method including synchronous refreshing, asynchronous refreshing and the like.

According to one embodiment of the invention the security breach indicative icon buffer 62 includes pull up and/or pull down circuits that determine the values of pixels of the security breach icon. These pull up and/or pull down circuits can be replaced by fuses. Fuses can also by includes in addition to pull up or pull down circuits. It is noted that other one time programmable components can be used. The one time programmable components can be read after a power on reset is detected, and their content can be stored in a memory entry that can be read but not overwritten, after the booting sequence ends.

Figure 4:
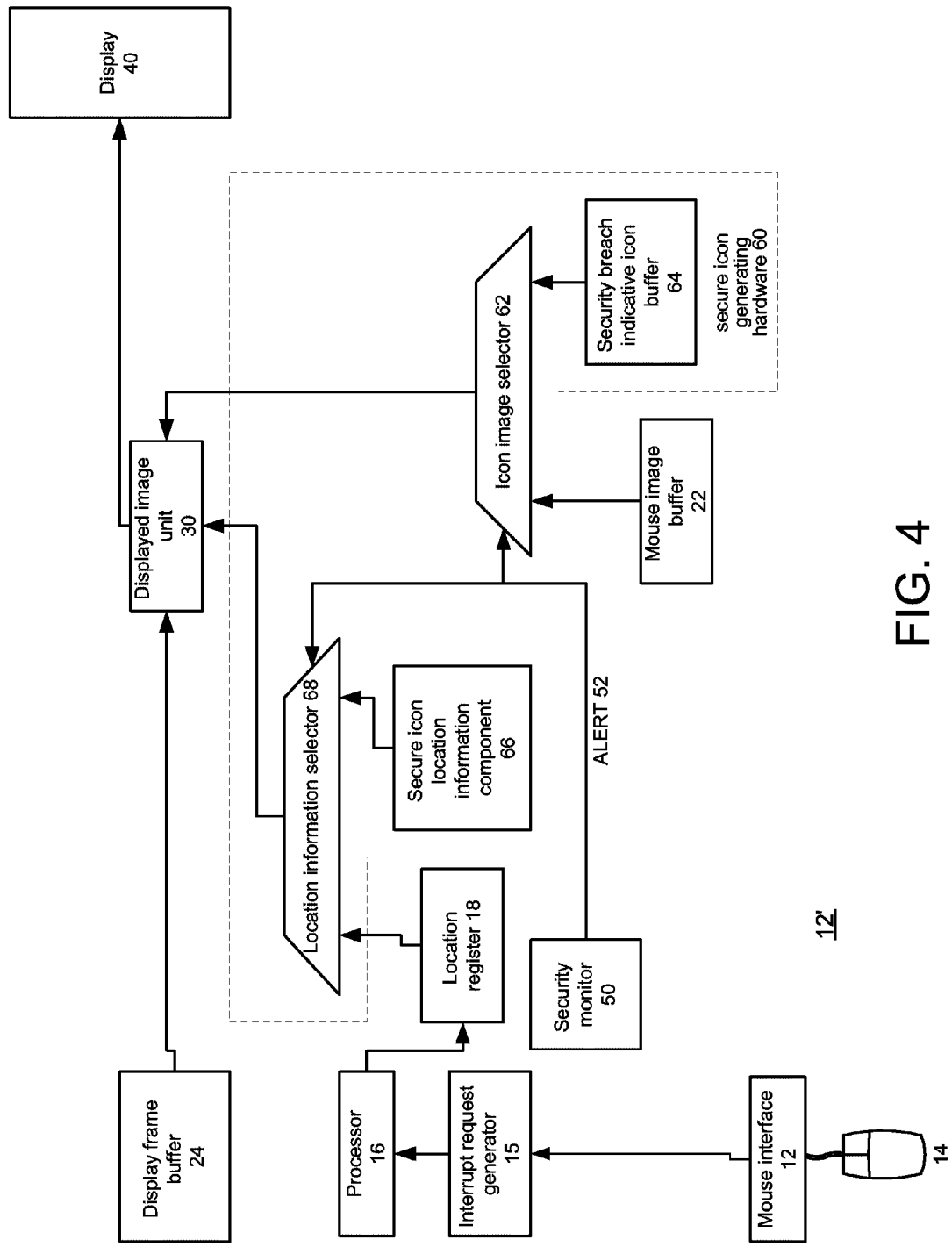
FIG. 4 illustrates various components of a device according to an embodiment of the invention.

FIG. 4 illustrates a portion 12' of device 10' according to another embodiment of the invention. Device 10' differs from device 10 of FIG. 2 by further including a secure icon location information component 66 that provides location information, and location information selector 68. The secure icon location information component 66 can store predefined location information that guarantees that the security breach indicative icon is displayed on display 40. The location information can have a fixed value that can be set by fuses, pull up circuits, pull down circuits one time programmable circuits and the like. The location information can be read to a buffer after each power on reset detection, but this is not necessarily so.

According to an embodiment of the invention the secure icon location information can change over time, especially when the device executed an application that does not use a mouse icon or in other occasions in which the user does not expect to view a mouse icon. The alterations can be made randomly, pseudo-randomly or according to a predefined sequence. It is noted that random changes in the location of the security breach indicative icon and/or random changes in the image of the security breach indicative icon can prevent the hacker from masking the security breach indicative icon.

When a security breach is detected ALERT 52 is used to select both the secure icon location information component 66 and the security breach indicative icon buffer 62.

Figure 5:
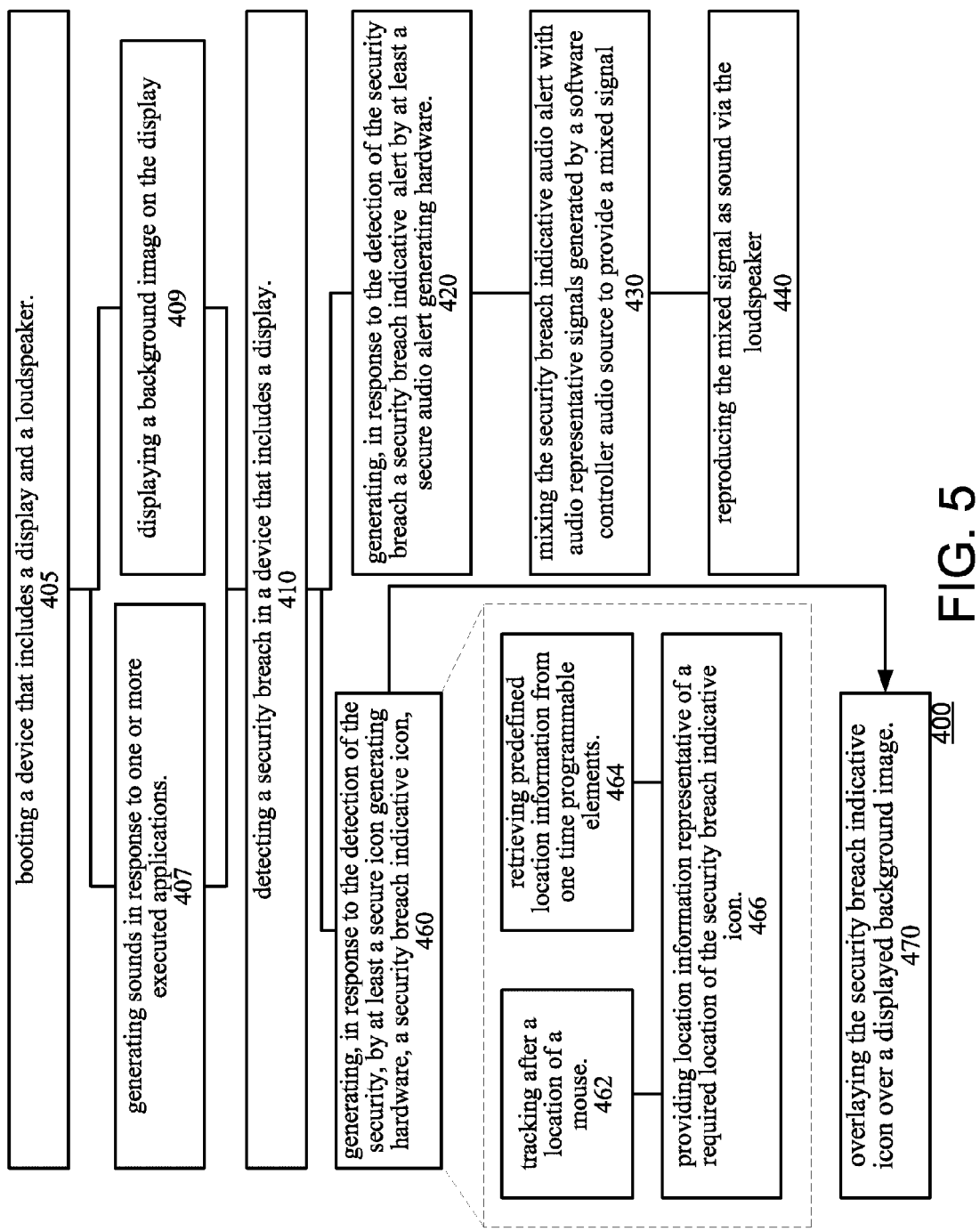
FIG. 5 illustrates a method for providing a security breach indicative icon and audio alert according to an embodiment of the invention.

FIG. 5 illustrates method 400 for providing a security breach indicative icon and audio alert according to an embodiment of the invention.

Method 400 starts by optional stage 405 of booting a device that includes a display and a loudspeaker.

Conveniently, method 400 includes programming one-time programmable elements with security breach indicative icon information.

Conveniently, the booting can include writing information to secured memory elements that can be locked from further write attempts.

Stage 405 is followed by stages 407 and 409.

Stage 407 includes generating sounds in response to one or more executed application.

Stage 409 includes displaying a background image on the display. It is noted that the background image can be dynamically updated and that it can include multiple images, text, and the like.

Stages 405 and 407 is followed by stage 410 of detecting a security breach in a device that includes a display.

Stage 410 is followed by stages 420 and 460.

Stage 420 includes generating, in response to the detection of the security breach, by a secure audio alert generating hardware, a security breach indicative audio alert signal.

Stage 420 is followed by stage 430 of mixing the security breach indicative audio alert signal with audio signals generated by a software controlled audio source to provide a mixed signal.

Stage 430 is followed by stage 440 of reproducing the mixed signal as sound via the loudspeaker.

Stage 460 includes of generating, in response to the detection of the security breach, by at least a secure icon generating hardware, a security breach indicative icon.

Conveniently, stage 460 includes replacing a software-generated mouse icon by the security breach indicative icon. The replacement can be executed by using a multiplexer, by using logic gates and combinatorial logic.

Conveniently, stage 460 includes stage 466 of providing location information representative of a required location of the security breach indicative icon.

Conveniently, stage 466 is preceded by stage 462 of tracking after a location of a mouse.

Conveniently, stage 466 is preceded by stage 464 of retrieving predefined location information from one time programmable elements. It is noted that stages 462 and 464 are dependent upon the configuration of the device or upon the application that is being executed by the device. When a device is expected to show an icon that tracks after the movement of a mouse then stage 462 is usually followed by stage 466, else stage 464 is followed by stage 466.

Conveniently, stage 460 includes generating a multi-colored icon. Masking a moving multi-colored mouse is very hard, as its location is not necessarily known in advance. Altering the background image in order to mask the icon can also alert the user that a security breach occurred.

Conveniently, stage 460 includes retrieving security breach indicative icon image information from one time programmable elements. Conveniently, stage 460 can include retrieving security breach indicative information from a secured memory unit.

Conveniently, stage 460 includes randomly altering at least one characteristic of the security breach indicative icon.

Stage 460 is followed by stage 470 of overlaying the security breach indicative icon over a displayed background image.

Conveniently, stage 470 includes overlaying the security breach indicative icon at the required location.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for providing a security breach indicative audio alert, the method comprises:
   detecting a security breach in a device that comprises a loudspeaker;
   responding to the detection of the security breach, by a secure audio alert generating hardware, a security breach indicative audio alert signal, wherein the generating comprising repetitively generating a security breach indicative audio alert signal for a predefined alert period;
   mixing the security breach indicative audio alert signal with audio signals generated by a software controlled audio source to provide a mixed signal; and
   reproducing the mixed signal as sound via the loudspeaker.

2. The method according to claim 1 wherein the generating comprises randomly altering at least one characteristic of the security breach indicative audio alert signal.

3. The method according to claim 1 wherein the generating comprises dynamically altering at least one characteristic of the security breach indicative audio alert signal.

4. The method according to claim 1 further comprising:
   generating, in response to the detection of the security breach, by at least a secure icon generating hardware, a security breach indicative icon; and
   overlaying the security breach indicative icon over a background image.

5. The method according to claim 4 wherein the generating comprises replacing a software-generated mouse icon by the security breach indicative icon.

6. The method according to claim 4 wherein the generating comprises:
   providing location information representative of a required location of the security breach indicative icon; and
   wherein the overlaying comprises overlaying the security breach indicative icon at the required location.

7. The method according to claim 4 wherein the generating comprises retrieving security breach indicative icon image information from one time programmable elements.

8. The method according to claim 1 wherein detecting the security breach comprises detecting at least one of a difference between a currently executed software and a previously stored version of that software, a violation of the integrity of a program, and a security violation in a security application.

9. A device for providing a security breach indicative audio alert, the device comprises:
   a security monitor adapted to detect a security breach in the device and a loudspeaker;
   a secure audio alert generating hardware, adapted to participate, in response to the detection of the security breach, in a generation of a security breach indicative audio alert, wherein the secure audio alert generating hardware is adapted to repetitively generate the security breach indicative audio alert signal for a predefined alert period; and
   an audio mixer, coupled to the secure audio alert generating hardware, wherein the audio mixer is adapted to mix the security breach indicative audio alert signal with audio signals generated by a software controlled audio source to provide a mixed signal and to provide the mixed signal to the loudspeaker so that is adapted to reproduce the mixed signal as sound.

10. The device according to claim 9 wherein the secure audio alert generating hardware is adapted to randomly alter at least one characteristic of the security breach indicative audio alert signal.

11. The device according to claim 9 wherein the secure audio alert generating hardware is adapted to repetitively generate the security breach indicative audio alert signal to dynamically alter at least one characteristic of the security breach indicative audio alert signal.

12. The device according to claim 9 further comprising:
   a display, a secure icon generating hardware, and a display image unit;
   wherein the secure icon generating hardware is adapted to participate, in response to the detection of the security breach, in a generation of a security breach indicative audio alert;
   wherein the secure icon generating hardware is coupled to the display image unit that is adapted to cause the display to display a background image and a security breach indicative audio alert that is overlaid over the background image.

13. The device according to claim 9 wherein in detecting the security breach, the security monitor is adapted to detect at least one of a difference between a currently executed software and a previously stored version of that software, a violation of the integrity of a program, and a security violation in a security application.

14. The device according to claim 9 wherein the device is adapted to replace a software-generated mouse icon by the security breach indicative audio alert.

15. The device according to claim 9 wherein the secure icon generating hardware is adapted to provide location information representative of a required location of the security breach indicative audio alert; and wherein the display image unit is adapted to cause the display to overlay the security breach indicative audio alert at the required location.

16. The device according to claim 9 wherein the secure icon generating hardware is adapted to provide predefined location information from one time programmable elements.

* * * * *